US008799029B2

(12) United States Patent
Bodas

(10) Patent No.: US 8,799,029 B2
(45) Date of Patent: Aug. 5, 2014

(54) SYSTEM AND METHOD FOR AUTOMATED DETECTION OF COVERAGE EXCEPTIONS BASED ON UTILITY USAGE DATA

(75) Inventor: Rohit S. Bodas, Burlington, MA (US)

(73) Assignee: Hartford Fire Insurance Company, Hartford, CT (US)

( * ) Notice: Subject to any disclaimer, the term of this patent is extended or adjusted under 35 U.S.C. 154(b) by 49 days.

(21) Appl. No.: 13/271,316

(22) Filed: Oct. 12, 2011

(65) Prior Publication Data

US 2013/0096954 A1   Apr. 18, 2013

(51) Int. Cl.
*G06Q 40/08* (2012.01)
*G06Q 20/00* (2012.01)

(52) U.S. Cl.
USPC ................................ 705/4; 705/63

(58) Field of Classification Search
None
See application file for complete search history.

(56) References Cited

U.S. PATENT DOCUMENTS

| 6,868,386 | B1 | 3/2005 | Henderson et al. | |
|---|---|---|---|---|
| 8,046,243 | B2 | 10/2011 | Winkler | |
| 8,090,598 | B2 | 1/2012 | Bauer et al. | |
| 2005/0055249 | A1 | 3/2005 | Helitzer et al. | |
| 2008/0065427 | A1 | 3/2008 | Helitzer et al. | |
| 2008/0189142 | A1 | 8/2008 | Brown et al. | |
| 2008/0319665 | A1 | 12/2008 | Berkobin et al. | |
| 2009/0235992 | A1* | 9/2009 | Armstrong | 137/487.5 |
| 2009/0261943 | A1 | 10/2009 | Jana et al. | |
| 2010/0131303 | A1* | 5/2010 | Collopy et al. | 705/4 |
| 2011/0022421 | A1 | 1/2011 | Brown et al. | |
| 2011/0106567 | A1* | 5/2011 | Asher | 705/4 |
| 2011/0153369 | A1* | 6/2011 | Feldman et al. | 705/4 |
| 2012/0116820 | A1* | 5/2012 | English et al. | 705/4 |

* cited by examiner

*Primary Examiner* — Robert Niquette
*Assistant Examiner* — Irene Kang
(74) *Attorney, Agent, or Firm* — Howard IP Law Group, PC

(57) ABSTRACT

An advanced underwriting and risk evaluation system leverages data from utility based metering devices and other IP addressable devices, and machines to provide real time operational and usage data. The data is used by an insurance entity to modify and adjust insurance coverages and premiums in the case of certain usage exceptions and conditions in view of an underlying policy coverage.

26 Claims, 7 Drawing Sheets

SYSTEM AND METHOD FOR AUTOMATED DETECTION OF COVERAGE EXCEPTIONS BASED ON UTILITY USAGE DATA

BACKGROUND AND FIELD

This application is in the field of computerized systems and methods for processing data related to insurance, and particularly insurance related to real property.

The Internet through social networks and online communities has opened up a wide variety of businesses which leverage the internet's global connectivity and resources. The worldwide accessibility of such sites opens up a multitude of opportunities for consumers of every kind. For example, certain sites operate as community marketplaces for people to list, discover, and book unique spaces around the world online. Whether the available space is a house for a night, a sailboat for a week, or an apartment for a month, such online sites make the process of listing or booking a space effortless and efficient. Generally, individuals with spare rooms in their homes or individuals who may be on vacation for a period of time may list their homes or apartments on these sites for rent. Third parties who may be traveling in such areas or who are unwilling to pay the typically higher charges associated with conventional hotel rooms then have an opportunity to rent these rooms out. However, such expanded use of properties and dwellings implicates a number of potential problems and issues.

For example, use of residential properties for commercial purposes may be outside the scope of certain regulations, rules and contracts. A residential property insurance policy may exclude any commercial use of the property from coverage for loss or injury. Expanded uses of commercial properties, such as beyond a certain pre-established threshold or occupancy may also be outside the parameters of such policies. A significant hurdle exists though in detecting and enforcing such expanded or out of scope uses as generally the individual property owners or proprietors may be reluctant to self-report such use or may simply be ignorant of such exclusions in their policies.

Accordingly, it would be desirable to detect uses of residential and commercial properties outside the parameters of insurance policies, regulations and the like, in a timely manner.

SUMMARY OF THE INVENTION

Figure 1:
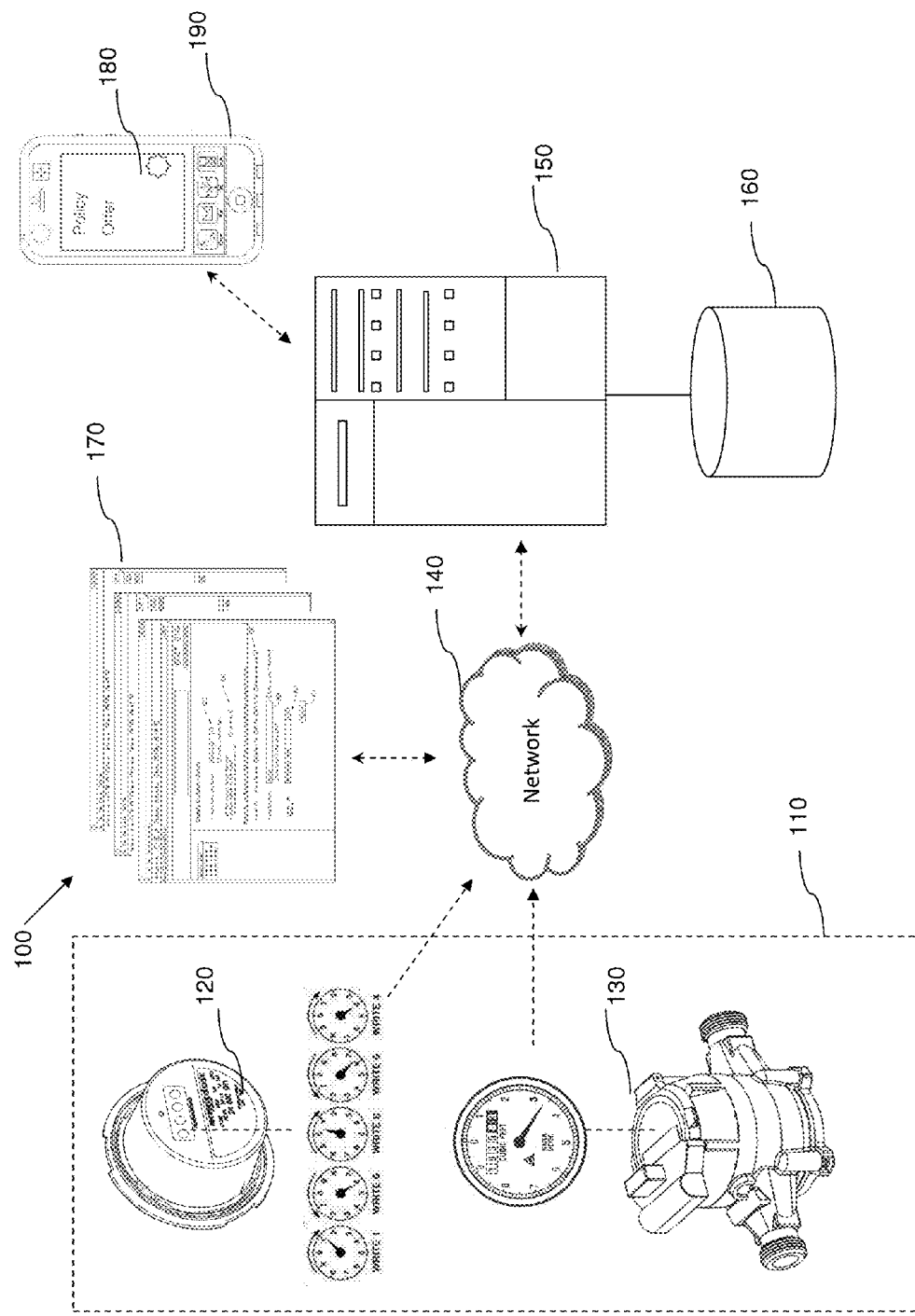
FIG. 1 is a diagram of a system according to some embodiments of the present invention.

The present invention in some embodiments is a system for advanced underwriting and risk evaluation utilizing a plurality of networked devices associated with an insured structure.

In embodiments, the invention relates to a system for automated detection of certain property uses for the generation of additional insurance coverage recommendations utilizing a plurality of networkable devices associated with an individual's insured property. The system may include a storage device having a database storing data related to property coverage parameters, historical utility usage data and usage threshold parameters associated with the insured property, the property coverage parameters representative of covered uses under an insurance policy for the insured property. A communications device in communication with the storage device may be configured to receive current usage information from a plurality of networked metering devices. A processor in communication with the communications device may be configured to compare the current usage information to the historical utility usage data to determine whether the current usage has exceeded the threshold parameter, wherein the processor is further configured to generate an insurance coverage recommendation responsive to determining that the usage has exceeded the threshold parameter, wherein the coverage recommendation for the insured structure is transmitted to the individual via the communications device.

In other embodiments, the invention relates to a system for utilizing a plurality of networked metering devices to detect uninsured conditions associated with at least one insured entity. The system includes a communications interface configured to receive usage based information from at least one of the plurality of networked metering devices. A storage device has a database configured to store both historical usage based information and real-time usage based information from the at least one of the plurality of networked metering devices. A processor in communication with the storage device is configured to compare the historical usage based information and the real time usage based information in order to detect whether an exception condition has occurred, wherein the processor is further configured to generate an insurance coverage offer to the at least one insured entity in the event an exception condition has occurred. The communications interface is further configured to transmit the insurance coverage offer to the at least one insured entity.

In other embodiments, the invention relates to a computer implemented method for intelligently monitoring at least one property for uses outside the scope of current in-force insurance coverages. The computer implemented method includes receiving, via a communications device, historical and real time usage based information from at least one of the plurality of wireless metering devices; storing, in a database on or more storage devices, both historical usage based information and real-time usage based information from at least one of the plurality of wireless metering devices; accessing, via the communications device, insurance policy data related to the at least one property; processing, in at least one processor, the historical usage based information, the real time usage based information and the insurance policy data in order to determine whether a use outside the scope of current in-force insurance coverages has occurred, wherein the processor is further configured to determine an insurance coverage communication to at least one entity; and transmitting, via the communications device, an electronic message containing the insurance coverage communication to the at least one insured entity.

A technical effect of the invention is an automated facilitation of advanced intelligent underwriting and risk evaluation which benefits consumers, business owners and insurance company entities. With this and other advantages and features that will become hereinafter apparent, a more complete understanding of the nature of the invention can be obtained by referring to the following detailed description and to the drawings appended hereto.

DETAILED DESCRIPTION

The present invention, in some embodiments, is a system to collect, manage and analyze data from a variety of sensors and devices for use in determining insurance risk, loss control, underwriting, and up-selling and cross-selling opportunities for an insurance entity. By way of specific example, the present invention may be configured to detect instances of property uses that may be outside the parameters of the intended use of a property. The intended use may be provided for in an existing insurance policy covering the property, which, for example, may only cover residential use of a residential property. Generally, a residential property insurance policy may include a number of exclusions or uncovered conditions, such as no coverage for losses related to commercial use of a residential property as may occur when a residential property owner uses their primary residence as a rental property.

Recent development in sensor technologies and networking protocols may provide a solution to these problems. These new technologies offer unprecedented flexibility, variety and richness in device interconnectivity and communications for the home and commercial enterprises. Many devices from computers, televisions, tools, appliances, water/power/electrical meters, etc can now connect seamlessly and allow data sharing and communication in both home and business environments. Such technologies present many untapped opportunities for many industries including the insurance industry, especially with respect to insurance underwriting, risk evaluation, marketing and selling. Systems in accordance with embodiments of the present invention may perform more accurate real time underwriting and risk evaluation to the benefit of consumer, insurers and related agencies and leverage the emergence of more robust networking and connectivity standards to provide greater underwriting accuracy, discipline and flexibility.

The present system is enabled to provide active and real time insurance underwriting, marketing and selling and may be used to detect commercial uses of a residential property and then provide potential supplemental or additional coverage for such commercial use. The system of the present invention effectively and proactively allows the management of risk and provides insurance entities with the ability to offer additional coverages, adjust premiums, extend or cancel coverages, and provide proactive notification of potential risk or loss based on collected data. With the system, an insurance company can perform more accurate underwriting and risk evaluation by receiving and analyzing information from the various networked metering devices, such as information related to a home or commercial establishment's occupancy and use.

In embodiments of the present invention a number of technologies/protocols may be used alone and/or in combination with one another to perform the advanced intelligent underwriting discussed herein including the use of wireless technologies such as may operate in compliance with one of the IEEE 802.11 family of standards (including IEEE 802.11, 802.11a, 802.11b, 802.11g and 802.11n). The IEEE 802.11 family of standards specify over-the-air interfaces in a wireless LAN (Local Area Network), e.g., between a wireless client and a base station or another wireless client or device. The IEEE 802.11 standards place specifications on the parameters of both the physical (PHY) and medium access control (MAC) layers of the network for communication between one or more devices within a wireless LAN as described in more detail later herein. Additionally other technologies/protocols such as 802.15.4, Zigbee, Z-Wave, Zero Configuration Networking, UPnP, Jini and JXTA among others may be used to implement the present invention. Zero Configuration Networking (Zeroconf) is a technology developed by Apple Computer and is built upon technologies known as multicast DNS and DNS Service Discovery.

Additionally, Universal Plug and Play (UPnP) may be utilized and is a technology, backed by the UPnP Forum initiated by Microsoft and uses the Simple Service Discovery Protocol (SSDP). The UPnP architecture allows peer-to-peer networking of PCs, networked home appliances, CE devices and other wireless devices. UPnP is a distributed, open architecture protocol based on established standards such as TCP/IP, UDP, HTTP, XML, and SOAP. Jini is a technology based on the Java platform and actively supports service discovery, description, invocation and presentation, all implemented using standard Java facilities. Like Jini, JXTA has been developed by Sun Microsystems and is a complete middleware infrastructure for building peer-to-peer systems that scales from local area networks to the global internet. The present invention may also be further enabled by Internet Protocol version 6 (IPv6) which implements new features that simplify aspects of address assignment such as stateless address autoconfiguration. It is contemplated that the present invention may use one or a combination of these or other various technologies to accomplish the objectives of the present invention such as the real-time detection of uncovered conditions or uses of insured property.

FIG. 1 is a representation of a system 100 of the present invention which includes a wireless based communications environment 110 in accordance with an illustrative embodiment of the present invention. The wireless environment 110 is one embodiment of a residence, apartment, building, or other location in which certain sensors, meters, devices, and computing devices may communicate utilizing wireless connection signals and protocols. The environment may be an individual's primary home, condominium or apartment, a small commercial establishment or a large corporate setting. Wireless environment 110 may include any number of metering devices, machines or other components and an exemplary number are shown merely for illustrative purposes. Devices within wireless environment 110 may communicate via short-range or long-range wireless enabled communication mediums including AM, FM, VHF, UHF, 2.4 Ghz, Microwave, 802.x, Bluetooth, WIFI enabled networks, a wireless home RF network, a cellular telephone network, a satellite network, a laser communication medium, an infrared communication medium, or any other type of communication medium.

Referring still to FIG. 1, in one embodiment, wireless environment 110 may include a wireless enabled electrical meter 120 and a wireless enabled water meter 130 which are in communication with a network 140. Wireless enabled electrical meter 120 and a wireless enabled water meter 130 may be implemented in accordance with Automated Meter Reading (AMR) and Advanced Metering Infrastructure (AMI) standards as well as certain PowerLine Communications (PLC) technologies standards including HomePlug AV/IEEE 1901 and ITU-T G.hn technologies and related standards. AMR meters provide one-way communications, enabling entities to read the meter automatically and remotely using different communication solutions including RF wireless, Power Line Carrier, and GPRS. AMI based meters are two-way communication enabled and thus can communicate with a utility company, insurance entity or other related monitoring entity as well as communicate directly with other meters, and devices.

Network 140 may be one or a combination of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Electrical meter 120 may be a self-contained electronic electric meter for measuring electricity usage and monitoring power quality in wireless environment 110. Electrical meter 120 may have transceiver capabilities for transmitting and receiving information, such as electricity usage information via network 140. Water meter 130 may also have transceiver capabilities for transmitting and receiving water utility consumption via network 140. In the present invention network 140 is further in communication with an insurance company associated server 150 and database 160. In other embodiments, server 150 may also be associated with an insurance company vendor, a utility company or third party monitoring company. Server 150 may also access one or more third party web sites 170 via network 140 to supplement information stored in database 160. In one embodiment, database 160 may be configured to store data and information received from electrical meter 120, water meter 130, website related information from website 170 as well as a variety of historical utility usage data and policyholder information, as discussed in more detail later herein. Based on processing of this stored information by server 150, system 100 may be configured to provide or offer additional or supplemental insurance coverages 180, and/or warnings or alerts of possible violation of policy conditions or limitations, to policyholder device 190 based on certain detected conditions such as a usage condition not covered in an existing insurance policy for the property.

In the present invention, system 100 may also be configured to communicate with one or more utility meters, home appliances, lighting and appliance control systems, network devices, televisions, gaming systems, DVD players, video recorders, security systems, video surveillance, alarm systems, and other devices to detect historical and current usage conditions within a dwelling, apartment or home.

Figure 2:
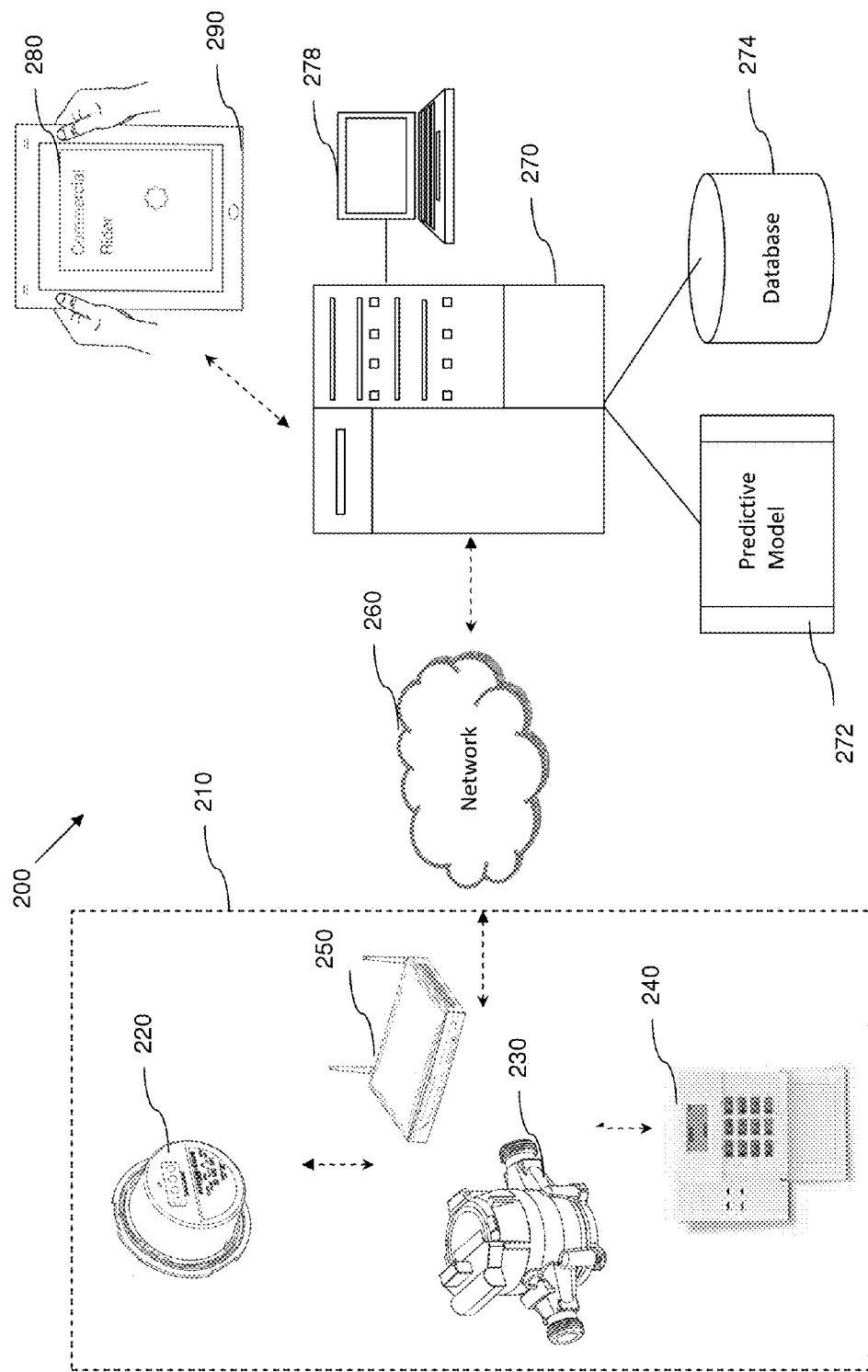
FIG. 2 is a diagram of a system according to some embodiments of the present invention.

FIG. 2 is a representation of another embodiment of a system 200 of the present invention which includes a wireless router based communications environment 210 in accordance with an illustrative embodiment of the present invention. The wireless router based environment 210 is one embodiment of a residence, apartment, building, or other location in which certain sensors, meters, devices, and computing devices may communicate utilizing wireless connection signals and protocols. Wireless router based environment 210 may be an individual's primary home, vacation or second home, a small commercial establishment or a large corporate setting. The wireless environment may include any number of metering devices, machines or other components and an exemplary number are shown merely for illustrative purposes.

Referring still to FIG. 2, in one embodiment, wireless environment 210 may include an electrical meter 220, a water meter 230 and a home security device 240 which are in communication with a wireless router 250. Wireless router 250 may be a device such as those available from Linksys Group Inc. (Irvine, Calif.) or Cisco Systems, Inc. (San Jose, Calif.) and may include one or more wireless access points to provide a central point for connectivity in the wireless network and always-on connectivity necessary for tracking usage information within wireless environment 210. Home security device 240 acts as the central access and control point for the security system for the residence in the illustrative embodiment and includes a display which may be of the liquid crystal variety, for presenting various systems status, configuration, alarm, operational modes, and other data. Home security device 240 may also have transceiver capabilities for transmission and receipt of security based information to and from wireless router 250. Information such as the frequency of doors and windows being opened may be captured and recorded, such as in conjunction with one or more sensors and/or motion detectors, by home security device 240 to assist system 200 in determining usage information in conjunction with electrical meter 220 and water meter 230 the type of occupancy and use of a home, apartment or other dwelling in accordance with the present invention.

In the present invention, wireless router 250 is in further communication with network 260 for transmission of usage information to an insurance company operated server 270. Insurance company operated server 270 may include a predictive model 272 and at least one database 274. In various implementations, server 270 may include as few as one predictive model or a plurality of interacting predictive models. Predictive model 272 preferably takes into account a large number of parameters such as utility usage, policy parameters and other external factors such as social or community network data. Predictive model 272, in various implementations, may include one or more of neural networks, Bayesian networks (such as Hidden Markov models), expert systems, decision trees, collections of decision trees, support vector machines, or other systems known in the art for addressing problems with large numbers of variables. Preferably, the predictive model 272 is trained on prior data and outcomes known to the insurance company. The specific data and outcomes analyzed vary depending on the desired functionality of the particular predictive model. The particular data parameters selected for analysis in the training process are determined by using regression analysis and/or other statistical techniques known in the art for identifying relevant variables in multivariable systems. The parameters can be selected from any of the data parameters stored in database 274 such as historical utility usage, current utility usage and insurance data. By accessing data stored in database 274 and interacting with predictive model 272, insurance company operated server 270 may determine whether current detected usage and other data is within or outside one or more threshold parameters.

Referring still to FIG. 2, server 270 may further be coupled to a workstation 278. In one embodiment, database 274 may be configured to store data and information received from electrical meter 220, water meter 230, security system 240 as well as a variety of historical utility usage data and policyholder information that may be viewed on workstation 278. Based on processing of this stored information by server 270, system 200 may be configured or formatted for transmission of alerts or warnings related to current insurance coverage and/or coverage offer 280 of additional or supplemental insurance coverages to a portable computing device of at least one insured entity such as a policyholder smartphone, personal computer or tablet computing device 290. Tablet computing device 290 may be any one of a variety of tablet computers such as the iPad, by Apple, Inc., the HP Tablet, by Hewlett Packard, Inc., the Playbook, by RIM, Inc., the Tablet, by Sony, Inc., etc.

Figure 3:
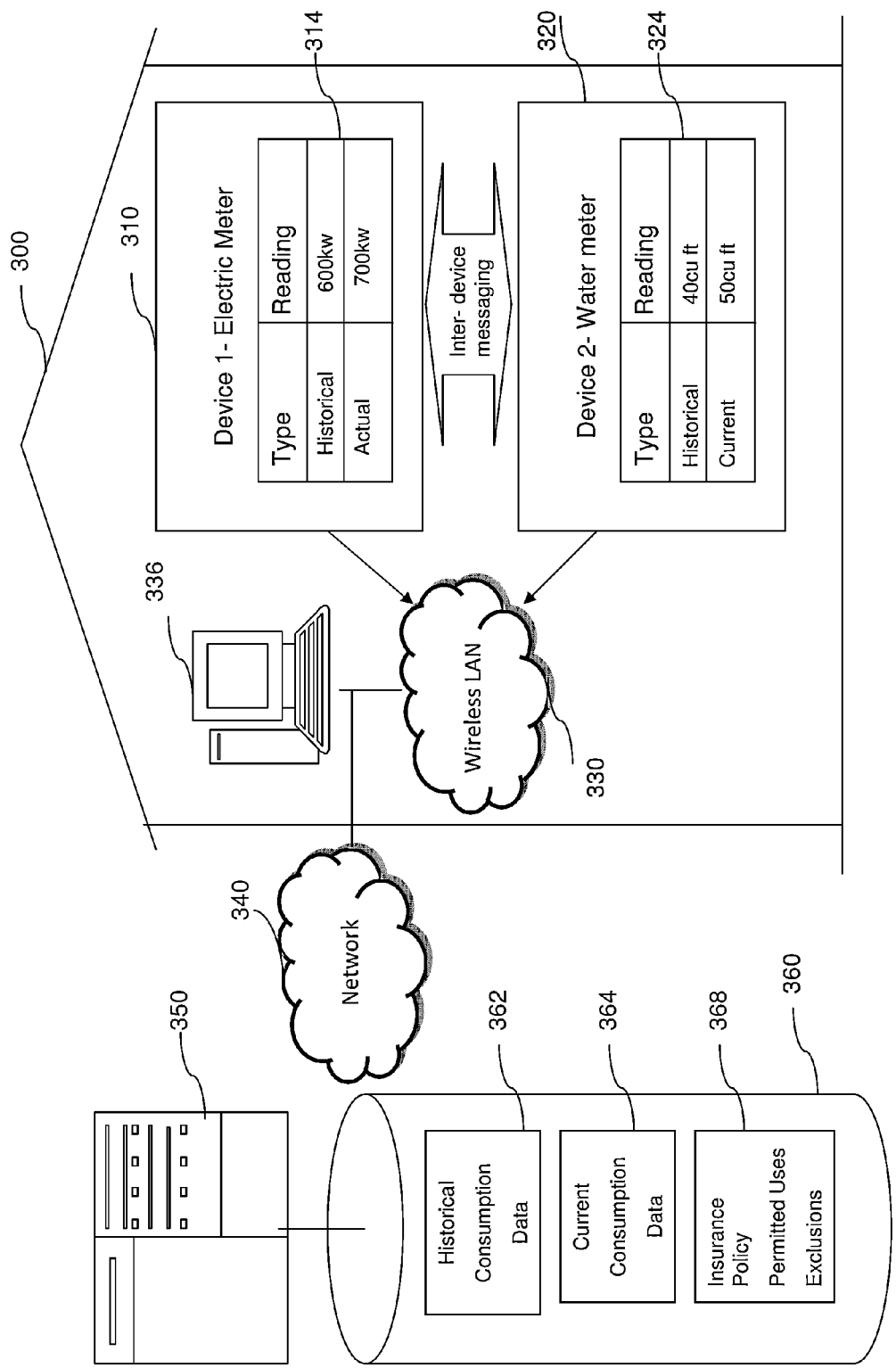
FIG. 3 illustrates a home-based system according to some embodiments of the present invention.

Referring now to FIG. 3, the present invention will be described in a non-limiting Universal Plug and Play context but the present invention contemplates that any one of the various technologies such as Zeroconf, Jini and JXTA may be used to implement the teachings of the present invention. A UPnP compatible device, such as a UPnP enabled utility meter or other measuring device can dynamically join a network, obtain an IP address, announce its name, convey its capabilities upon request, and learn about the presence and capabilities of other devices via an initial registration message. The UPnP registration or description for a device may be expressed in XML and include vendor-specific, manufacturer information like the model name and number, serial number, manufacturer name, URLs to vendor-specific web sites, etc. The registration message also includes a list of any embedded devices or services, as well as URLs for control, event logging, and presentation. For each service, the description includes a list of the commands, or actions, to which the service responds, and parameters, or arguments, for each action; the description for a service also includes a list of variables which model the state of the service at run time, and are described in terms of their data type, range, and event characteristics.

Referring now to FIG. 3, another embodiment of the present invention is shown with a representative residence 300 where a number of metering devices 310 and 320 are in communication with one another to provide residence usage information for the detection of one or more uncovered usage conditions for residence 300. In this embodiment, residence 300 may include electric meter 310 which is in communication with water meter 320 utilizing AMI based architecture. Electric meter 310 is configured to capture and store historical and current usage data 314. Water meter 320 is configured to capture and store historical and current usage data 324. Although only electric meter 310 and water meter 320 are shown, information from any number of transceiver capable/wireless devices may collected and processed to perform advanced intelligent underwriting in accordance with the present invention. As shown, electric meter 310 and water meter 320 can join a local wireless network 330, describe themselves and their capabilities, and enable each other without complicated set up or configuration. Electric meter 310 and water meter 320 can be both functional devices and/or control points or both and communicate bilaterally or unilaterally with the network as well as communicate with each other. In one exemplary UPnP based embodiment, electric meter 310 and water meter 320 interact with wireless LAN 330 and one or more personal computers 336 to accomplish IP addressing, device discovery, device description, action invocation or control, event messaging, and presentation or user interface.

Referring still FIG. 3, a computing device such as personal computer 336 may be coupled to wireless LAN 330. Wireless LAN 330 may be in communication with a network 340 that may include another LAN, a wide area network (WAN), a telephone network, such as the Public Switched Telephone Network (PSTN), a wireless network, an intranet, the Internet, a similar or dissimilar network, or a combination of one or more of the aforementioned networks. Network 340 facilitates communication between wireless LAN 330 and a processing server 350 which may be operated by an insurance entity or other entity under the control of the insurance entity. Server 350 may also be operated by a third party service provider who is providing services to the insurance entity. Server 350 may also be implemented in a cloud computing type architecture which is operational with numerous other general purpose or special purpose computing system environments or configurations. Examples of well-known computing systems, environments, and/or configurations that may be suitable for use with server 350 include, but are not limited to, certain server computer systems, thin clients, thick clients, personal computers, hand-held or laptop devices, multiprocessor systems, microprocessor-based systems, set top boxes, programmable customer electronics, network PCs, minicomputer systems, mainframe computer systems, and other distributed Cloud computing environments that include any of the above systems or devices.

Server 350 may also be implemented as certain computer system-executable instructions, such as program modules, being executed by a computer system. Generally, program modules include routines, programs, objects, components, logic, data structures, and so on that perform particular tasks or implement particular abstract data types. Server 350 may be practiced in distributed cloud computing environments where tasks are performed by logically or physically remote processing devices that are linked through communications network 340.

In the present invention, server 350 has access to storage device 360 such as any one of removable/non-removable, non-transitory, volatile/nonvolatile computer storage media. By way of example only, storage device 360 may be an optical disk drive or a magnetic disk or tape drive that reads from or writes to a removable, a nonvolatile storage medium such as an optical disk or magnetic tape or disk. Other removable/non-removable, volatile/nonvolatile computer storage media that can be used in the exemplary computer system include, but are not limited to, magnetic tape cassettes, flash memory cards, digital versatile disks, digital video tape, solid state RAM, solid state ROM, and the like. Storage device 360 may be a standalone storage device or configured in a storage array or a distributed type of database environment such as in a cloud computing architecture.

Referring still to FIG. 3, storage device 360 may include one or more databases such as a historical consumption database 362, a current consumption database 364 and an insurance policy database 368. Historical consumption database 362 may include historical electric usage information from electric meter 310 and historical usage information from water meter 324. Current consumption database 364 may include current or real-time electric usage information from electric meter 310 and current or real time usage information from water meter 324. Insurance policy database 368 may include current and historical policy information such as policy information related to residence 300 and one or more other residences. Policy information may include data related to the permitted uses for residence 300 such as whether the residence is a personal or commercial. Insurance policy database 368 may also include information such as data related to certain exclusions in one or more insurance policies. Exclusions may relate to certain uses or conditions which may be excluded from coverage in an insurance policy, such as commercial use of a personal home. In some embodiments of the present invention, server 350 processes the historical consumption data, the current consumption data and the insurance policy data to determine if a certain use exception or excluded condition has occurred in order to offer the policyholder the option to select additional or supplemental coverage for the use. In other embodiments, the detection of such as excluded use or exception may be used to cancel an existing insurance policy or place the policy on hold.

In the present invention, the historical data may originate from prior monitored time period(s) of ordinary and customary usage for the property being monitored. For example, historical data may be generated and save based on a predetermined time period of prior monitoring such as a week, month, quarter, year or other pre-determined time period in which a company, such as an insurance entity collects historical data. Historical data may be supplemented by a peer to peer comparison of similar properties in certain geographical and/or demographic classifications. For example, historical data may comprise a fixed or rolling six month period of homes in a certain zip code and the normalized utility usage for the similarly situated homes to establish a baseline electrical, water or other utility usage as a reference point or threshold. In accordance with the present invention, if a system server such as server 350 shown in FIG. 3 detects a change above a predetermined amount or limit above the certain threshold, then a potential usage exception may be detected resulting in an offer of new insurance or a modification of an existing policy as discussed in more detail later herein.

In some embodiments of the present invention, the magnitude of the change above a predetermined amount or limit above the certain threshold may be used as an input in pricing the offer of new insurance or the modification of an existing policy. For example, if the magnitude of the change above a predetermined amount or limit is 20% about the covered limit in an existing policy, the resulting offer of new insurance may be priced with an increase of premium proportional or related to the 20% increase in usage. Pricing of the offer of insurance may take into account a number of factors and variables such as historical loss data, loss ratios and expense loads. Complex multivariate analyses using generalized linear modeling as well as other statistical methods may be used in assessing the premium to be charged in the offer of insurance.

Figure 4:
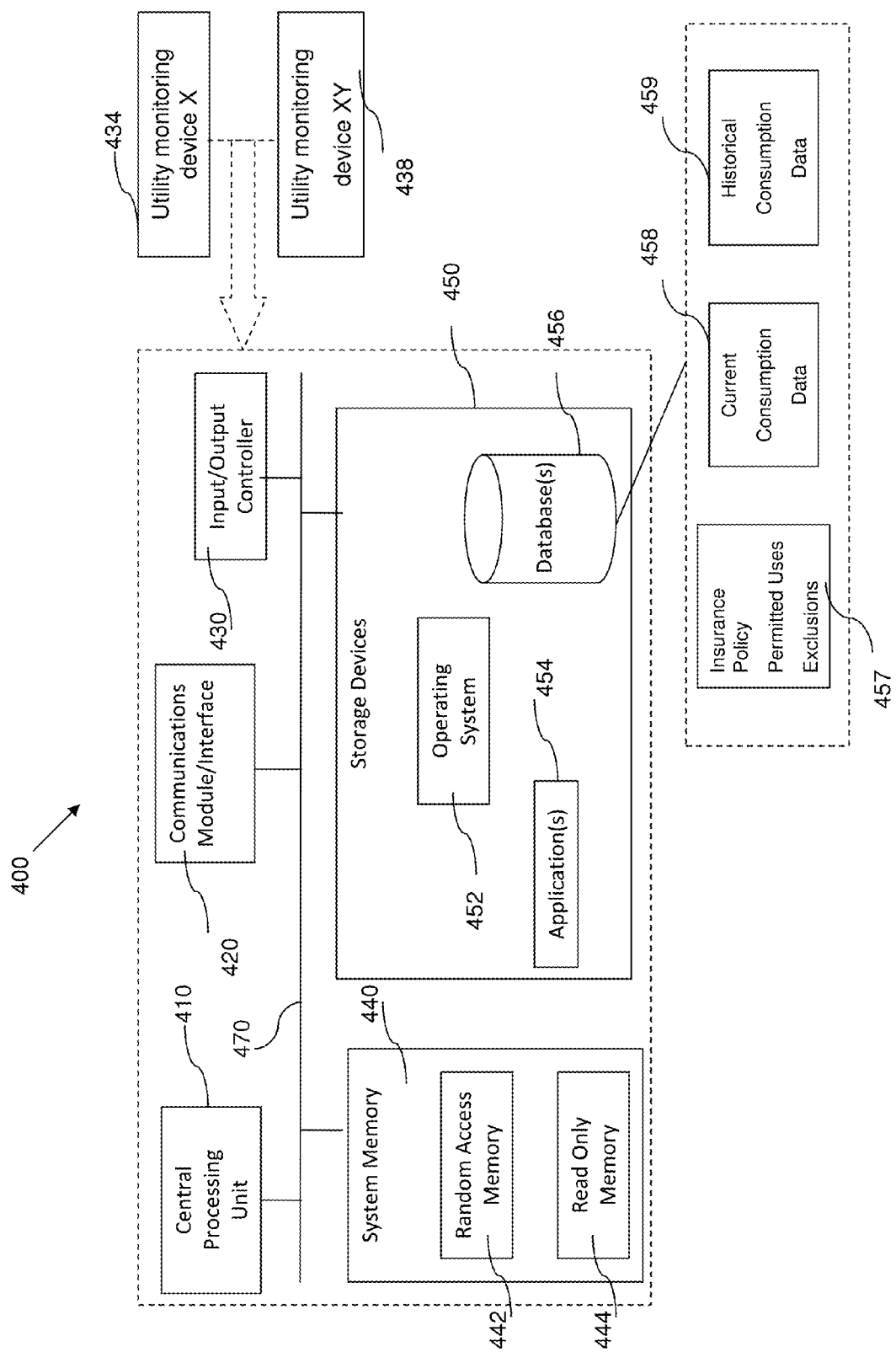
FIG. 4 illustrates an exemplary system architecture in accordance with some embodiments of the invention.

Referring to FIG. 4, a system architecture 400 of the present invention is shown which includes a central processing unit 410, a communications module/interface 420, an input/output controller 430, a system memory 440 that includes a random access memory 442 and a read only memory 444 and a storage device 450 including an operating system 452, one or more application(s) 454 and further coupled to a database(s) 456 via a bus 470, in accordance with embodiments of the present invention. Database 456 may include one or more sub-databases for the storage of insurance policy data 457, current consumption data 458 and historical consumption data 459.

Database(s) 456 may include a database management system (DBMS) software of a relational database type, such as a DB2 universal database product provided by International Business Machines Corporation, an Access product provided by Microsoft Corporation or an Oracle Database product provided by Oracle Corporation for storing and processing information related to usage and policy information in accordance with the present invention. In one embodiment, database 456 may also provide certain database query functions such as generation of structured query language (SQL) in real time to access and manipulate the data.

In operation, system 400 may receive certain utility monitoring device data such as from utility monitoring devices 434 and 438 for processing via central processing unit 410 and storage on storage device 450. System 400 may also include a real time, bidirectional, reliable messaging application to transmit messages to one or more policyholders, such as policy offers, warning messages, informational messages or communications about the usage, etc. over network via communications module 420. In the present invention, messages may include reminder voice mail, text and/or electronic mail message such as electronic mail messages based on one or more of the messaging protocols including IMAP, POP3, MIME and SMTP for alerting or communicating with one or more policyholders. An exemplary message of the present invention may be an electronic mail message warning to a policyholder that a certain detected use is excluded from their in force insurance policy and also may include an offer of additional or supplemental insurance for the policyholder, such as a real time binding offer for insurance to cover the detected condition, and additionally, background information about the detected condition and options for the policyholder.

Figure 5:
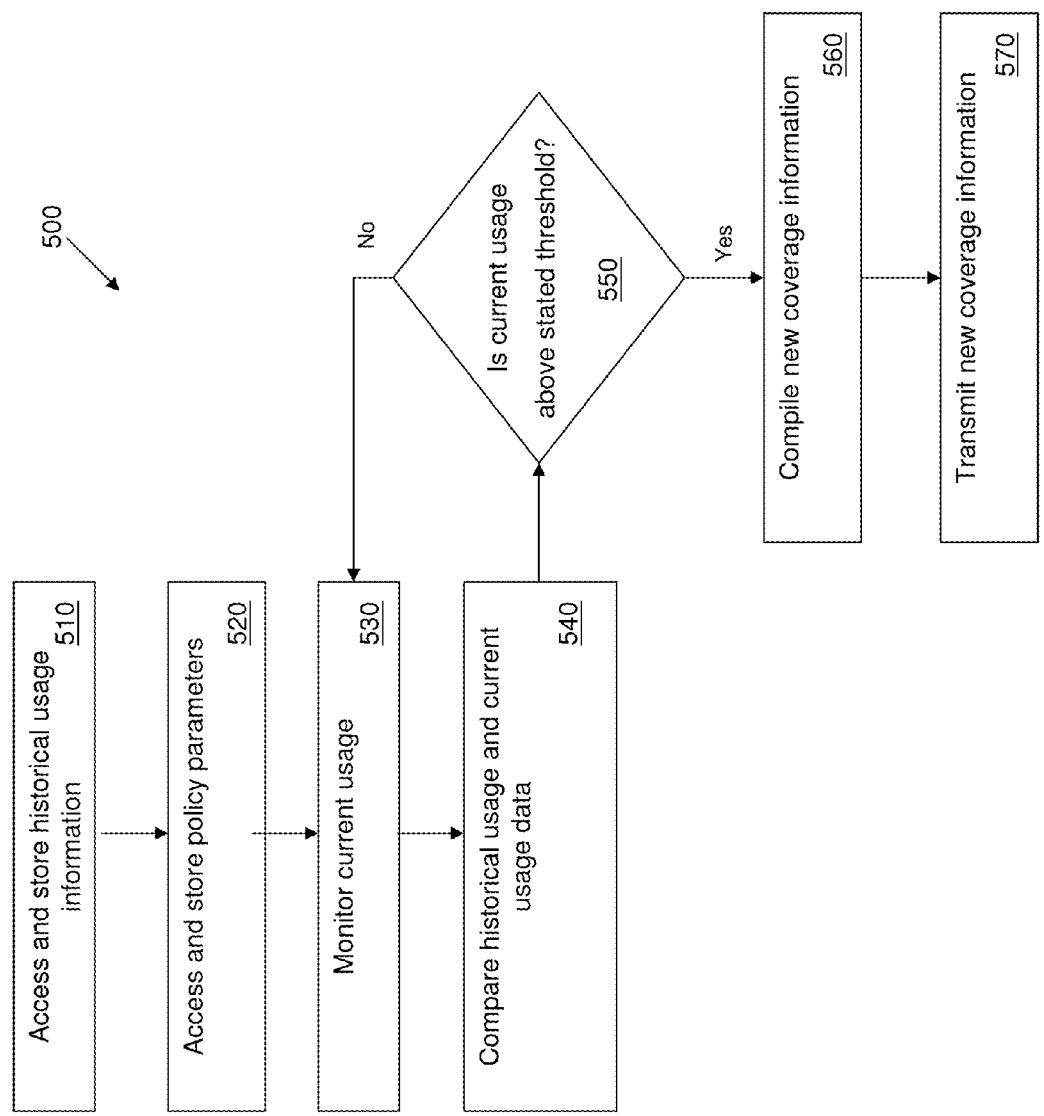
FIG. 5 illustrates a computer implemented method in accordance with some embodiments of the invention.

FIG. 5 illustrates an exemplary process flow 500 of an embodiment of the present invention. Initially, certain monitoring or metering device information is accessed and stored such historical usage information, such as may be received from an electric meter 310 shown in FIG. 3, step 510. Certain insurance policy parameters are then accessed and stored, such as may be stored in storage device 360 shown in FIG. 3, step 520. Current usage information is then monitored, such as from a water meter device 320 shown in FIG. 3, step 530. The historical usage and current usage data is then compared, step 540. The system, such as processing server 350 shown in FIG. 3, determines if the current usage is equal to or above a stated threshold or limits, step 550. If the current usage is not equal to or above a stated threshold, then the system continues to monitor current usage, step 530. If the current usage is equal to or above a stated threshold, then new coverage information is compiled, step 560. As discussed herein, the stated threshold or limits may be an absolute number, a range, a relative number or a weighted number or range. In one embodiment, a current usage range over a certain period of time is compared with a historical range to which a number of external factors such as weather are applied to in order to determine if the current usage is equal to or above a certain state threshold. New coverage information may be in the form of a new insurance policy or rider to cover use above the stated threshold. The system then transmits the new coverage information, step 570, to an entity such as a current policyholder or a potential future policyholder.

In the present invention, processing of the historical and current data may be performed in accordance with one or more predictive models and/or algorithms. For example, such predictive models and/or algorithms may utilize certain baseline or reference ranges of historical usage data as an input. In one exemplary determination, an established baseline historical electrical usage for a property in the range of 250-350 kilowatt hours (kWh) for a given measuring period, such as a 24 hour period, may be established. It is contemplated that baseline limits or ranges may be established for any one or combination of electrical, water, cable, security, and other metrics within a property. The system of the present invention may then monitor current electrical usage to potentially detect a usage exception based on this baseline range.

The system would monitor then current electrical usage in view of this baseline range during a certain predefined period such as a 24 hour period. Readings from the electrical meter would be taken at the beginning and end of the established period to make a real time current usage determination. For example, the system may receive a current initial electrical meter reading of, for example, 001563, for the designated period and a later reading of 001940. The system performs a calculation of 001940-001563 to obtain 377 kWh of electricity used for the current measuring period. The system may compare the 377 kWh with the established range of 250-350 kWh to determine that there is a 27 kWh difference (377 kWh-350 kWh) between the current reading and the top end of the established historical electrical usage range. Based on this difference or deviation from the established historical range, the system may determine that a usage exception has occurred in the property. For example, the extra electrical usage may be attributed to a renter being present in that time frame in the property of a policyholder. Accordingly, the policyholder may be offered a new or supplemental insurance policy to account for the commercial use of the residential property. Similar calculations as performed above with respect to electrical usage may be performed with respect to water usage, cable and internet usage, etc. to determine if a usage exception has occurred in the property.

Figure 6:
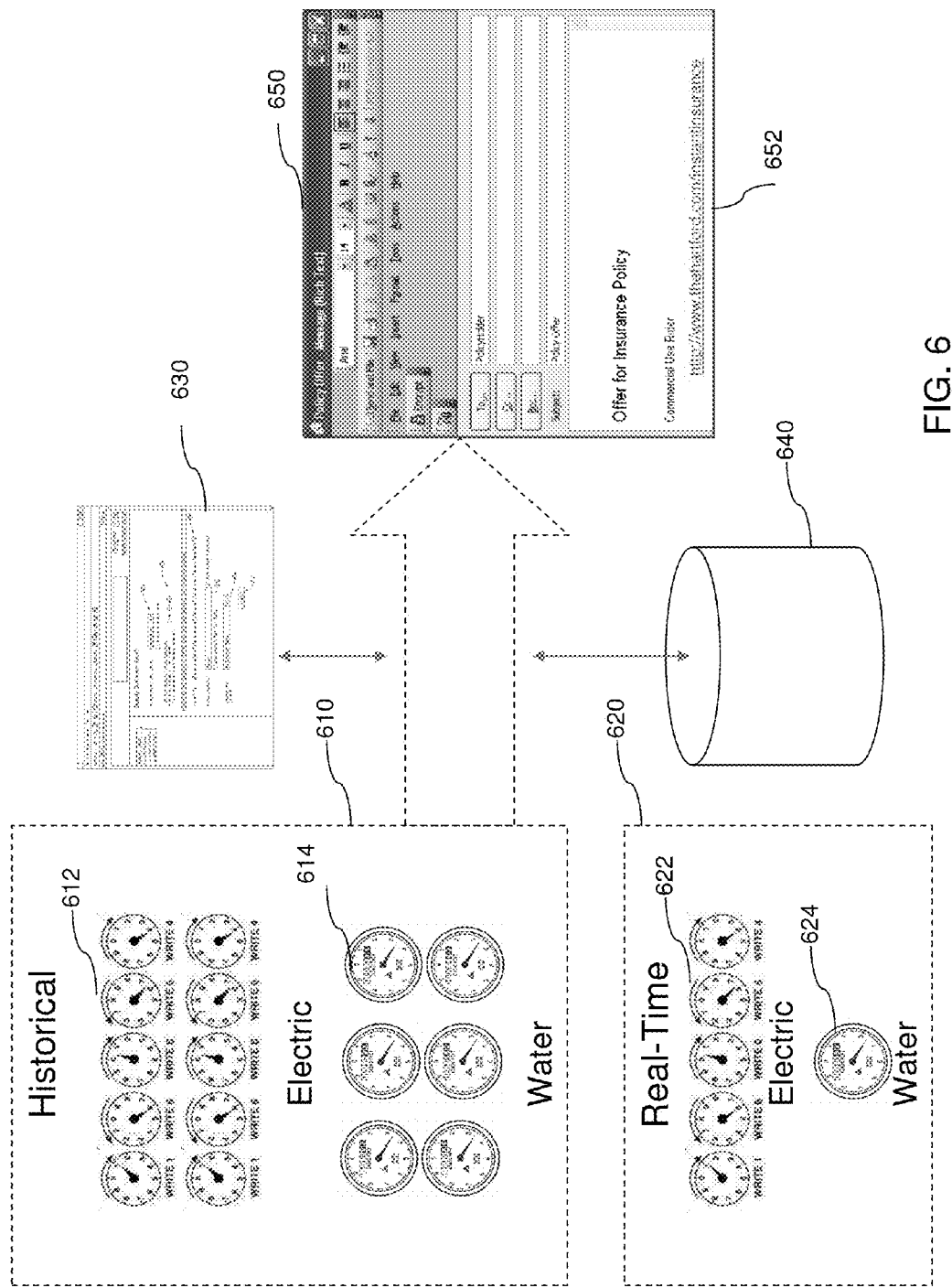
FIG. 6 illustrates a number of exemplary data flows in accordance with some embodiments of the invention.

FIG. 6 illustrates a diagrammatic representation of a number of data flows of the present invention. Insurance company operated server 150 as shown in FIG. 1 may access and process historical usage data 610 such as historical electric usage data 612 and historical water usage data 614. Server 150 may also access and process real time data 620 such as current electric data 622 and real time water data 624. Server 150 may additionally access and process certain third party data 630 such as certain web site information. Web site information may include information from a website such as AirBNB, a weather related site or other site. Such websites may provide additional information to be factored in by server 150 when making a determination whether a certain uncovered use has occurred with the property. For example, during times of extreme weather, certain utility usage rates may spike or rise, such as during times of extreme heat, so server 150 will factor in the appropriate weightings of the electrical usage data based on such weather information. For example, thresholds of utility usage, such as electricity or natural gas, may be increased by percentages, absolute values, or based on other formulas, based on a difference between current temperature data, such as high, low, mean, and average temperatures, as compared to actual temperatures for a reference period or historical average or mean temperatures. It will be appreciated that temperature is an example of weather data, and other weather data, such as wind speed or cloud cover data, by way of example, which affect utility usage, may be employed. Additionally, if server 150 may access certain social network or online community data to help determine if certain other uncovered uses are occurring for a property, such as a policyholder listing rooms out in their personal residence for rent.

Referring still to FIG. 6, server 150 further accesses and processes insurance policy data from database 640. The aforementioned data are processed and compiled to make a determination as to whether to offer an insurance policyholder an offer for insurance 650. The offer for insurance 650 may be in the form of an electronic mail message, web page or other electronic documents which is transmitted to an entity for review and approval. As used herein, the term electronic documents can include electronic mail message, word processing files, computer data files, HTML Web pages, XML documents, and any other digitally encoded electronic file. As will be explained in greater detail below, the processing of the electronic documents can include the transmittal of the document to specified recipients such as a number of current or potential policyholders. Additionally, the processing of the document can include the incorporation of additional information, such as the appending of digital signatures, to the electronic documents. Offer for insurance 650 may include a link 652 which once accessed may take the entity to a web page or other mechanism for binding an insurance coverage or policy for the detected condition, such as commercial use of the residential property.

In the present invention, offer for insurance 650 may be in the form of a new policy, a rider on an existing policy, a renewal policy, an increase in certain liability limits, a stretch endorsement or other variations on coverages for the property. In the instance of a residential property being used for commercial purposes, such a policy may cover certain property of the owner such as the house, belongings, automobile, etc., property of renter such as belongings, automobile, etc. and even neighbor's property such as a house, belongings, automobile, etc. in the event of damage during the commercial use of the property. The insurance policy may also offer coverage for general liability claims such as slip and falls, etc., as well as fire, smoke, and water damage claims. Other policy modifications contemplated include the adjustment of premiums on an existing policy, such as the raising of premiums for a residential property being used for commercial purposes based on the detected condition.

Generally, offer for insurance 650 may be provided to the property owner who holds the underlying existing primary policy on the residence or property. It is contemplated though that the offer for insurance could also be provided to a third party such as a renter who could purchase one day "renter's policy." In embodiments, the offer for insurance could be made to an entity that holds another interest in the property, such as a mortgage holder. In the present invention, information related to the property owner and renter may be accessed via third party site 630.

Figure 7:
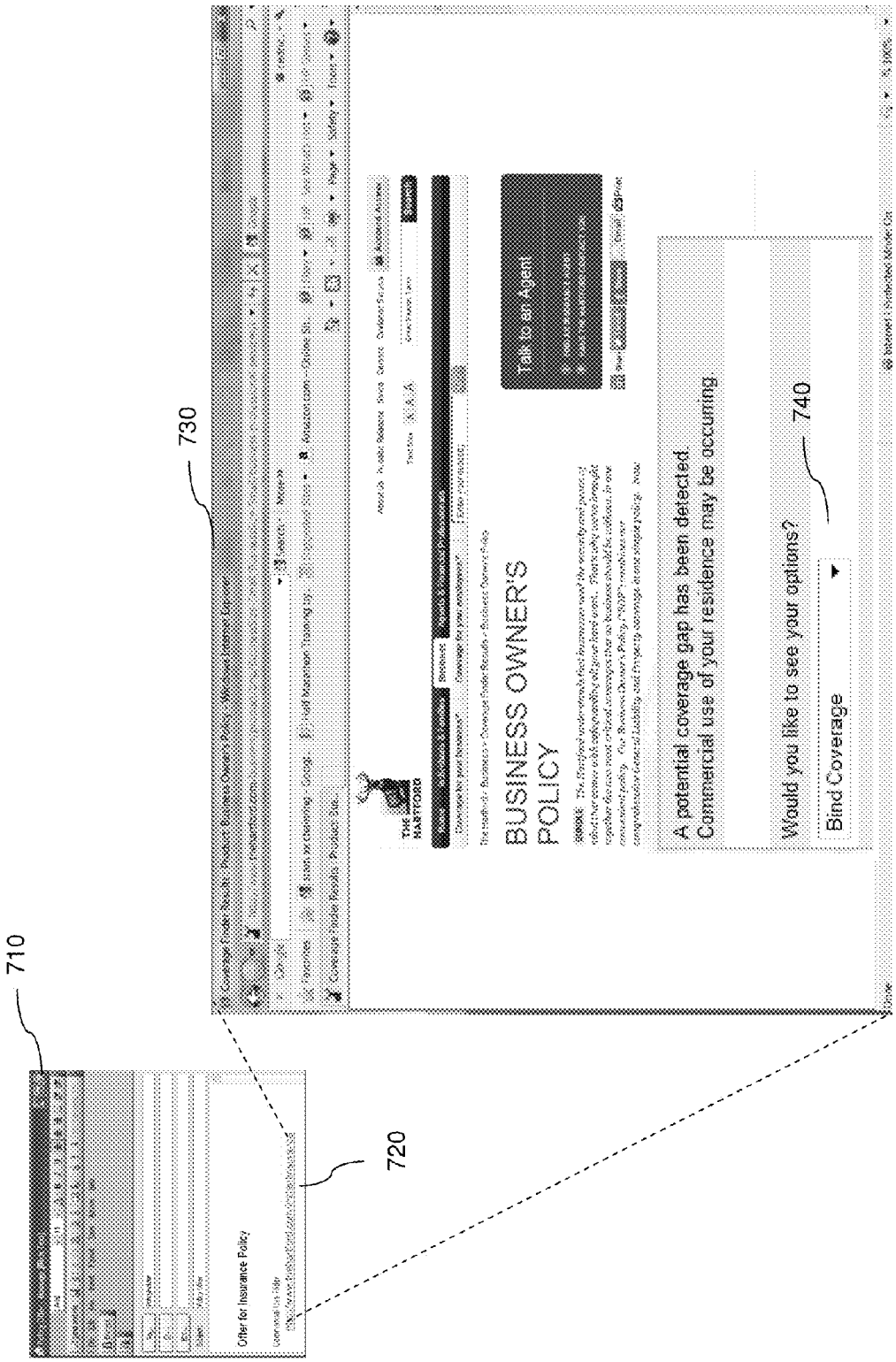
FIG. 7 illustrates an exemplary user interface in accordance with some embodiments of the invention.

Referring to FIG. 7, an exemplary user interface of the present invention is shown. A system, such as system 200 shown in FIG. 2 may generate an electronic document such as an electronic mail message 710 for transmission to a remote access user such as a current or potential future policyholder. Electronic mail message 710 may contain a hyperlink 720 for access by the remote access user. Hyperlink 720 may be presented within electronic mail message 710 as a highlighted portions of text which links the document to another hypertext or XML based document stored at a Web site or Web server on the Internet. Each hyperlink is associated with a Uniform Resource Locator ("URL") that provides the name of the linked document on a server connected to the Internet. Thus, whenever the hypertext document is retrieved from the web server, the document is considered retrieved from the World Wide Web. The web server may also include facilities for storing and transmitting application programs, such as application programs written in a variety of programming languages such as JAVA, for execution on a remote computer. Additionally, the web server may also include facilities for executing scripts and other application programs on the web server itself for provisioning the offer of insurance provided in accordance with the present invention.

The remote access user such as the policyholder may retrieve web based documents via a web browser program 730. Web browser 730, such as Microsoft's Internet Explorer, is a software application program for providing a user interface to the internet and upon request from the remote access user via the web browser, the web browser requests the desired web document from the appropriate web server using the URL for the document and the HyperText Transport Protocol ("HTTP"). Browser 730 may also retrieve programs from the web server, such as JAVA applets, for execution on the client computing device such a smartphone, personal computer or tablet computing device. Additionally, browser 730 may include optional software components, called plug-ins, that run specialized functionality within the browser such as for providing a binding offer of insurance subscreen 740 for interaction with the policyholder.

In embodiments of the present invention, communications between the insurance entity and the policyholders may be conducted in a secure manner such as via SSL which can be used to secure any network protocol that uses a TCP connection. For example, the HTTPS protocol will use SSL to provide a secure HTTP for the policyholder when the policyholder clicks on the link provided within electronic mail message 710. A number of various cryptographic algorithms may also be used as between the policyholder and the insurance entity to ensure secure communication. For example, a number of cryptographic schemas such as symmetric key (secret key) encryption, asymmetric key (public key) encryption, message digests and digital signatures and certificates may be used.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

What is claimed:

1. A system for automated detection of certain property uses for the generation of additional insurance coverage recommendations utilizing a plurality of networkable devices associated with an individual's insured property, comprising:
a storage device having a database storing data related to property coverage parameters, historical utility usage data and usage threshold parameters associated with the insured property, the property coverage parameters representative of covered uses under an insurance policy for the insured property;
a communications device in communication with the storage device, the communications device configured to receive current utility usage information from a plurality of networked metering devices associated with the insured property; and
a processor in communication with the communications device, the processor configured to compare the current utility usage information to the historical utility usage data to determine whether the current usage has exceeded the threshold parameter, wherein the processor is further configured to generate an insurance coverage recommendation for the insured property responsive to determining that the usage has exceeded the threshold parameter, the generating comprising determining the insurance coverage recommendation for insurance coverage of the insured property consistent with the determined usage, wherein the coverage recommendation for the insured property is transmitted to the individual owner of the insured property via the communications device.

2. The system of claim 1, wherein at least one of the networked metering devices is one of an electric meter and a water meter employing Advanced Metering Infrastructure (AMI) architecture.

3. The system of claim 2, wherein the processor interacts with a predictive model to determine if the current usage has exceeded the threshold parameter.

4. The system of claim 1, wherein at least one of the networked metering devices is a device for measuring internet usage.

5. The system of claim 1, wherein the networked metering devices includes an electric meter and a home security device.

6. The system of claim 1, wherein the individual is not a current insurance policyholder.

7. The system of claim 1, wherein the threshold parameter is a predetermined percentage above a range of historical usage data.

8. The system of claim 7, wherein the processor is further configured to account for variables including time of year and weather.

9. The system of claim 1, wherein the property coverage parameters relate to excluded uses of the property.

10. The system of claim 9, wherein at least one of the excluded uses of the property is commercial use of a residential property.

11. The system of claim 1, wherein an amount the usage has exceeded the threshold parameter is used to price the coverage recommendation.

12. The system of claim 1, wherein the insurance coverage recommendation is generated at the time of renewal for the insured property.

13. The system of claim 1, wherein the insurance coverage recommendation is an electronic mail message containing information related to binding coverage of an uncovered use under the existing insurance policy for the insured property.

14. The system of claim 1, wherein the insurance coverage recommendation is a binding offer for a stretch endorsement.

15. A system for utilizing a plurality of networked metering devices to detect uninsured conditions associated with at least one insured entity, comprising:
a communications interface configured to receive usage based information from at least one of the plurality of networked metering devices;
a storage device having a database configured to store both historical usage based information and real-time usage based information from the at least one of the plurality of networked metering devices; and
a processor in communication with the storage device and configured to compare the historical usage based information and the real time usage based information in order to detect whether an exception condition has occurred, wherein the processor is further configured to generate an insurance coverage offer to the at least one insured entity in the event an exception condition has occurred, the insurance coverage offer being for coverage of the insured entity and including coverage of the exception condition, wherein the communications interface is further configured to transmit the insurance coverage offer to the at least one insured entity.

16. The system of claim 15, wherein the insurance coverage offer is formatted for transmission to a portable computing device of the at least one insured entity.

17. The system of claim 15, wherein at least one of the networked metering devices is a radio frequency enabled electrical meter.

18. The system of claim 17, wherein at least one of the networked metering devices is a radio frequency enabled water meter.

19. The system of claim 15, wherein the database further configured to store insurance policy information related to the at least one insured entity.

20. The system of claim 15, wherein the insurance coverage offer is a binding offer for insurance.

21. A computer implemented method for intelligently monitoring at least one property for uses outside the scope of current in-force insurance coverages, the computer implemented method comprising:

receiving, via a communications device, historical and real time usage based information from at least one of a plurality of wireless metering devices associated with the property;

storing, in a database on or more storage devices, both historical usage based information and real-time usage based information from at least one of the plurality of wireless metering devices;

accessing, via the communications device, insurance policy data related to the at least one property;

processing, in at least one computer processor, the historical usage based information, the real time usage based information and the insurance policy data in order to determine whether a use outside the scope of current in-force insurance coverages has occurred, wherein the computer processor is further configured to determine an insurance coverage communication to at least one entity, the insurance coverage communication comprising an offer for coverage including the use outside the scope of the current in-force insurance coverages; and transmitting, via the communications device, an electronic message containing the insurance coverage communication to the at least one insured entity.

22. The computer implemented method of claim 21, wherein the computer processor is also configured to process third party web site data.

23. The computer implemented method of claim 21, wherein the insurance coverage communication is provided at a time for renewal of the in-force insurance coverages.

24. The computer implemented method of claim 21, wherein the electronic message containing the insurance coverage communication is a binding offer for insurance.

25. The computer implemented method of claim 21, wherein the electronic message communication contains background information about the use outside the scope of current in-force insurance coverages.

26. A system for automated detection of certain property uses for the generation of additional insurance coverage recommendations utilizing a plurality of networkable devices associated with an individual's insured property, comprising:

a storage device having a database storing data related to property coverage parameters, historical utility usage data and usage threshold parameters associated with the insured property, the property coverage parameters representative of covered uses under an insurance policy for the insured property;

a communications device in communication with the storage device, the communications device configured to receive current usage information from a plurality of networked metering devices; and a processor in communication with the communications device, the processor configured to compare the current usage information to the historical utility usage data to determine whether the current usage has exceeded the threshold parameter, wherein the processor is further configured to generate an insurance coverage recommendation responsive to determining that the usage has exceeded the threshold parameter, wherein the coverage recommendation for the insured structure is transmitted to the individual via the communications device;

wherein the networked metering devices includes an electric meter and a home security device.

* * * * *